Feb. 7, 1950        B. M. HYMAN        2,496,474

VERTICALLY SWINGABLE EXTENSION FOR TRACTOR DRAWBARS

Filed Sept. 23, 1948

Inventor:
Benjamin M. Hyman

Patented Feb. 7, 1950

2,496,474

UNITED STATES PATENT OFFICE 2,496,474

VERTICALLY SWINGABLE EXTENSION FOR TRACTOR DRAWBARS

Benjamin M. Hyman, Moline, Ill., assignor to International Harvester Company, a corporation of New Jersey Application September 23, 1948, Serial No. 50,742

2 Claims. (Cl. 280—33.44)

This invention relates to a new and improved vertically swingable extension for tractor drawbars.

Agricultural tractors are equipped with rearwardly disposed drawbars for drawing implements, wagons and other vehicles. Frequently the hitch members of the agricultural implements to be fastened to tractor drawbars are so heavy as to make it almost impossible for one man to raise the hitch to a position on or level with the tractor drawbar.

It is a principal object of this invention, therefore, to provide means associated with a tractor drawbar for raising the hitch members of trailing vehicles from a ground engaging position to a tractor drawbar mounted position.

An important object of this invention is to provide jacking means associated with a tractor drawbar to mount implements onto the tractor.

Another important object of this invention is the provision of means associated with a tractor drawbar for effecting vertical swinging of an outwardly extending arm arranged and constructed to raise the hitch members of trailing vehicles up and onto the tractor drawbar.

A still further important object of this invention is to provide fluid cylinder means positioned beneath a tractor drawbar to effect raising and lowering of a hinged extension arm.

Other and further important objects of this invention will become apparent from the disclosures in the following specification and accompanying drawing.

Figure 2:
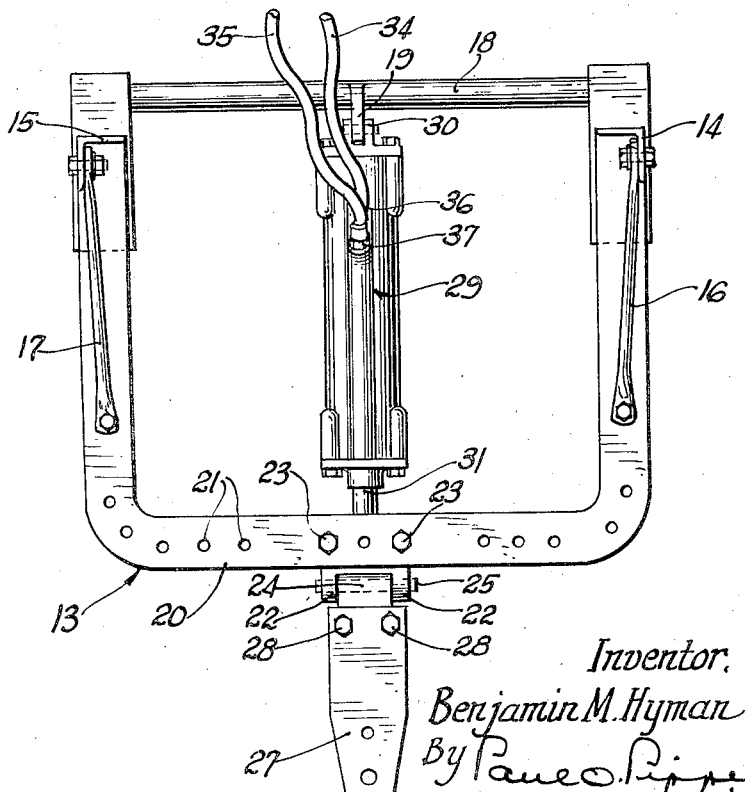
Fig. 2 is a top plan view of the device as shown in Fig. 1.

As shown in the drawing, the reference number 10 indicates generally the rear axle of an agricultural tractor having a housing 11 for receiving clamping and bracket means 12. A drawbar 13 is suspended from the bracket means 12 through the supporting members 14 and 15 and brace members 16 and 17. A top plan view of the drawbar 13, as shown in Fig. 2, indicates that the drawbar is substantially rectangular in shape. The forward side 18 of the rectangular drawbar 13 is substantially tubular and is provided with a downwardly depending bracket 19. A rearwardly disposed side 20 of the drawbar 13 is equipped with spaced holes 21 for receptive attachment of trailing vehicles.

A first hinge member 22 is bolted to the rearwardly disposed side 20 of the drawbar 13 at 23. A second cooperative hinge part 24 is joined to the first hinge part 22 by the transversely extending hinge pin 25. The hinge part 24 is provided with a downwardly extending arm 26 and an angularly spaced outwardly and rearwardly extending arm 27 which is bolted to the top of the hinge member 24 at 28. Angularly spaced arms 26—27 form a bell crank hinged at the intersection of the arms about the pin 25 and swinging movement of the arm 26 causes a similar swinging movement of the arm 27.

The function of the arm 27 is that of a jack or raising means for lifting a trailing vehicle or a trailing vehicle hitch up onto the tractor drawbar. Numerous means may be provided for effecting a raising and lowering of the hinged extension arm 27. However, in the present instance a much improved power means in the form of a fluid cylinder 29 is shown. The cylinder 29 is hinged in clevis form at 30 to the downwardly extending bracket 19 from the transversely disposed tubular member 18 which forms the forward side of the substantially rectangular drawbar 13. A piston 31 is slidably engaged with the fluid cylinder 29 for longitudinal reciprocation therein. The rearwardly extending end 32 of the piston 31 is hingedly attached at 33 to the downwardly extending arm 26 of the cooperative hinge member 24. As the piston 31 is moved rearwardly the hinged extension arm 27 moves upwardly, whereas when the piston 31 moves forwardly the hinged extension arm assumes the dashed line position as shown in Fig. 1.

A source of fluid under pressure is ordinarily maintained in agricultural tractors and flexible conduits 34 and 35 are located between the source of fluid supply (not shown) to attachments at 36 and 37 respectively on the fluid cylinder 29. The cylinder 29 is of the two-way type wherein the piston 31 is power moved in both forward and rearward directions.

Figure 1:
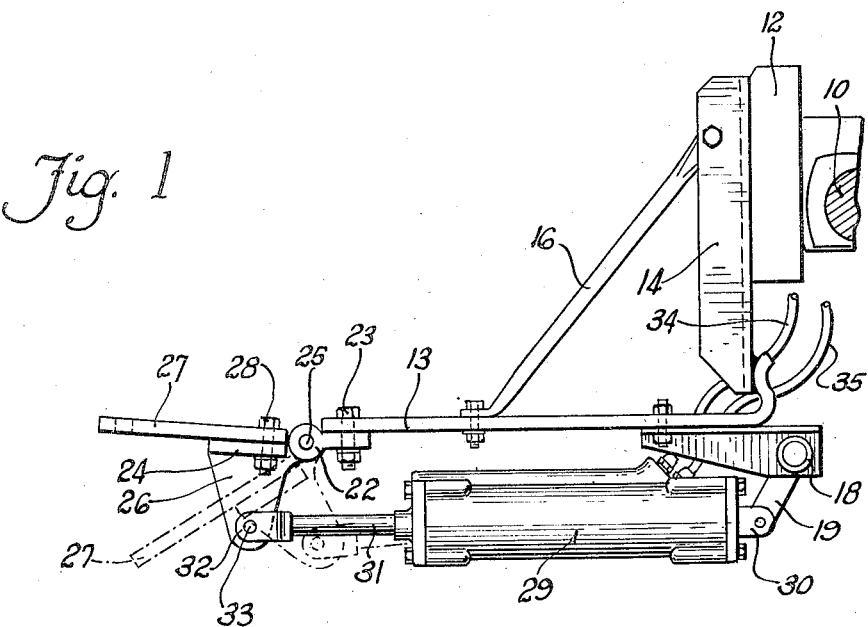
Fig. 1 is a side elevational view of a tractor drawbar having a swingable extension arm extending outwardly therefrom.

When it is desired to mount the implement onto a tractor drawbar the tractor is backed into the proximity of the implement to be mounted and the hinged extension arm 27 lowered to the dashed line position of Fig. 1, whereupon a portion of the implement to be mounted is placed on or over the arm 27 and thereupon fluid is directed to the cylinder 29 to cause rearwardly extending movement of the piston 31 and thus a raising of the extension arm 27 about the hinge pin 25. This, of course, causes a simultaneous raising of the implement to be mounted and the manual labor of lifting the trailing or tractor carried implement onto the tractor is eliminated.

I am aware that many details of construction may be varied throughout a wide range without departing from the principles disclosed herein and I therefore do not propose limiting the patent granted hereon otherwise than as necessitated by the appended claims.

What is claimed is:

1. An attachment for a tractor drawbar of substantially rectangular shape comprising a fluid cylinder hinged at its forward end to the forwardly disposed side of the rectangular drawbar, a piston slidably reciprocable within said fluid cylinder and extending in a rearward direction, a first hinge part fastened to the rearwardly disposed side of the rectangular drawbar, a cooperative hinge part joining said first hinge part for arcuate swinging movement with respect thereto, said cooperative hinge part having integral angularly spaced arms, the rearward end of said piston hingedly engaging one of said arms, whereby when fluid is directed into the fluid cylinder the movement of the piston causes a direct movement of the angularly spaced arm.

2. An attachment for a tractor drawbar of substantially rectangular shape and in which the forwardly disposed side is equipped with a downwardly extending bracket, comprising a fluid cylinder hinged at its forward end to the downwardly extending bracket on the forwardly disposed side of the rectangular drawbar, a piston slidably reciprocable within said fluid cylinder and extending in a rearward direction substantially parallel to and beneath the drawbar, a first hinge part fastened to the rearwardly disposed side of the rectangular drawbar, a cooperative hinge part joining said first hinge part for arcuate swinging movement with respect thereto, said cooperative hinge part having integral angularly spaced arms, one of said spaced arms extending downwardly and the other rearwardly, the rearward end of said piston hingedly engaging the downwardly extending arm, whereby when fluid is directed into the fluid cylinder the movement of the piston causes a direct movement of the rearwardly extending angularly spaced arm.

BENJAMIN M. HYMAN.

REFERENCES CITED

The following references are of record in the file of this patent:

UNITED STATES PATENTS

| Number | Name | Date |
| --- | --- | --- |
| 2,320,168 | Benjamin et al. | May 25, 1943 |